May 30, 1933.  J. H. VICTOR  1,911,484
GASKET
Filed April 2, 1931
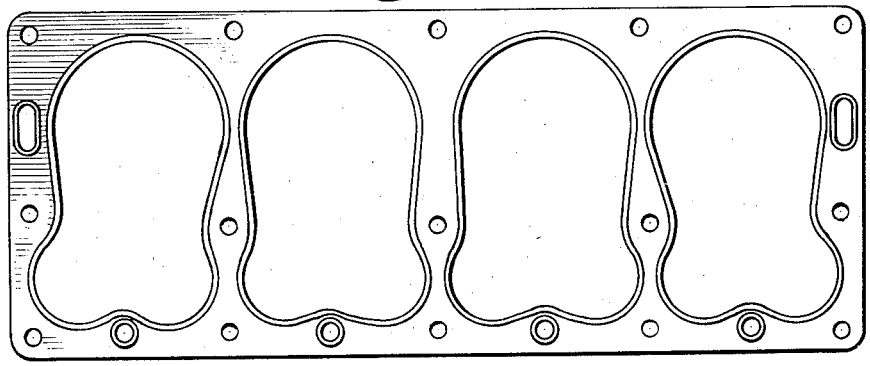
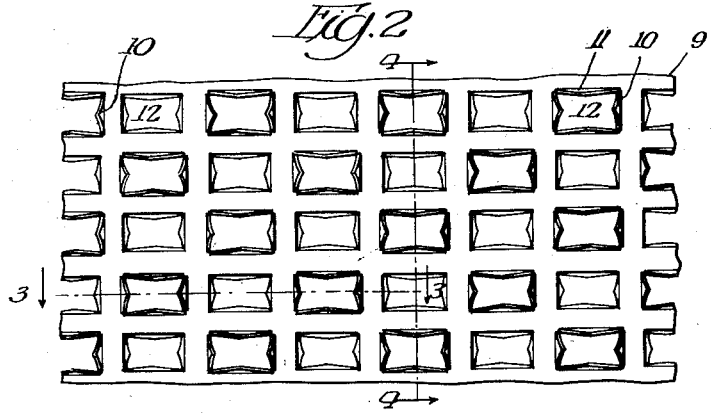
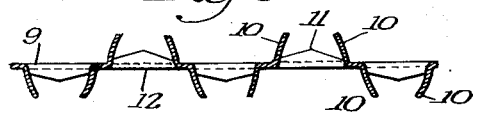
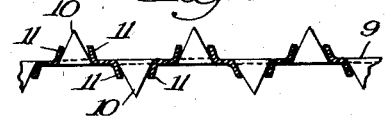
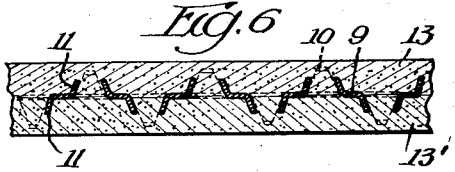
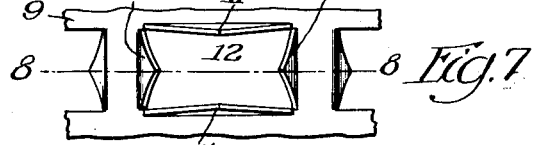
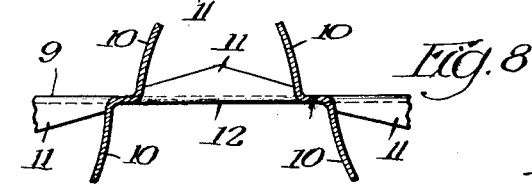
Inventor:
John H. Victor
By Wm. J. Belt, Atty.

Patented May 30, 1933

1,911,484

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed April 2, 1931. Serial No. 527,092.

This invention relates to improvements in gaskets and while it is particularly useful in gaskets of relatively large size, like cylinder head gaskets for internal combustion engines, it may be used in manifold gaskets and other gaskets of any size and shape and for any purpose for which it may be adapted.

The object of the invention is to provide a strong and substantial gasket having a light-weight sheet metal reenforce embedded in the gasket material and provided with integral prongs which are made and disposed to anchor the gasket material securely upon the reenforce and increase the resistance of the gasket material against gas and liquid pressures in service.

A further object of the invention is to provide a novel sheet metal gasket reenforce having prongs arranged and disposed to anchor gasket material thereon and to increase the resistance of the gasket material against gas and liquid pressures.

In the accompanying drawing illlustrating a selected embodiment of the invention Fig. 1 is a plan view of one form of cylinder head gasket in which my invention may be embodied.

Fig. 2 is an enlarged plan view of a fragment of the metal reenforce.

Fig. 3 is a sectional view on the line 3—3 of Fig. 2 showing a part of the reenforce.

Fig. 4 is a sectional view on the line 4—4 of Fig. 2 showing a part of the reenforce.

Fig. 5 is a sectional view showing gasket material applied to that part of the reenforce shown in Fig. 3.

Fig. 6 is a sectional view showing gasket material applied to that part of the reenforce shown in Fig. 4.

Fig. 7 is an enlarged detail plan view of the reenforce.

Fig. 8 is a sectional view on the line 8—8 of Fig. 7.

Referring to the drawing the reenforce 9 is made preferably from thin sheet metal and it is provided with prongs 10 and 11 struck up from the sheet on opposite sides thereof. Two prongs 10 and two prongs 11 are arranged in a group struck up together and leaving a single opening 12 which is preferably oblong in shape, the prongs 10 being located at the end edges and the prongs 11 at the side edges of the opening. All of these prongs are tapered centrally to a point and are inclined inwardly, the end prongs 10 being longer than the side prongs 11 and consequently are preferably inclined inwardly more than the side prongs 11. The point of intersection may be shifted to vary the respective lengths of the prongs 10, that is, one prong 10 may be made longer than the other prong 10 of the group. Likewise the lengths of the prongs 11 may be varied. The groups of prongs are arranged close together on the sheet and project alternately on opposite sides thereof. The groups may be symmetrically arranged, as shown in Fig. 2, or in any other arrangement that may be desired. The cutting of the sides of the prongs from the body and the severance of the ends of the prongs precedes the bending and consequently when the prongs are bent, the material is not stretched nor weakened. The gasket material consists of layers 13, 13' of asbestos millboard or other suitable gasket material and these layers are applied to the opposite sides of the metal reenforce by pressure sufficient to cause the prongs to penetrate the gasket material and the long prongs 10 to bend inwardly, as shown in Fig. 5, sufficient to clench and interlock with the gasket material and hold it securely and tightly upon the reenforce. The prongs 11 also assist in securing the gasket material to the reenforce but their primary function is to act as stops or supports and reenforces to assist the gasket material in resisting gas and liquid pressures in service. The long prongs 10 also function in this manner and for this purpose, and the short and long prongs co-operate not only in reenforcing the gasket as a whole to provide a strong and substantial gasket but also to reenforce the gasket material and make it especially resistant to the pressures to which gaskets are subjected in service. I have found it convenient to arrange the groups of prongs spaced apart in intersecting rows, as shown in Fig. 2, but they may be arranged in staggered relation or disposed in any other manner desired. I find it sufficient to provide two long and two short prongs in each group, with the long prongs at the end edges and the short prongs at the side edges of the opening formed by stamping up the group of prongs because this makes a desirable disposition of the prongs and the groups and insures anchorage of the gasket material to the reenforce and effective backing and support to prevent lateral displacement of the gasket material on the reenforce and to increase the resistance of the gasket material against gas and liquid pressures in service. The layers of gasket material are applied to the reenforce under pressure and comparatively slight pressure is required because the prongs are pointed. The long prongs 10 will bend sufficiently while the gasket material is being applied to the reenforce to clench upon the gasket material for anchoring it securely to the reenforce and this is accomplished without creating voids in the gasket material and without materially changing its structure or its cushion effect. The prongs are so severed from the body that slight burrs are formed on the underside of each prong. Thus, when the prongs are bent inwardly, these burrs aid the clenching of the gasket material to the body.

The invention provides a novel reenforce for gaskets which is adapted to be embedded in layers of gasket material and form a novel gasket of strong and substantial construction having desired cushion quality and reenforced as a whole, with the layers of gasket material reenforced uniformly throughout to form an efficient seal and present superior resistance to gas and liquid pressure in service.

I have described a gasket in a simple and satisfactory embodiment but there are a great many sizes and varieties of gaskets and while I believe the invention herein shown is capable of embodiment in any gasket for which it is adapted, it may be necessary or desirable to make changes in the form, construction and arrangement of parts of the invention for some adaptations and I reserve the right to make all such changes as fall within the scope of the following claim.

I claim:

A gasket comprising two layers of gasket material and an interposed sheet metal reenforce, said reenforce having oblong openings punched therein, the metal displaced in punching said openings being arranged alternately on opposite sides of the reenforce in the form of clinching prongs at the end edges and stop prongs at the side edges of the openings, the clinching prongs being longer than the stop prongs and penetrating the gasket material and being bent inwardly toward each other and clenched in the gasket material, and the stop prongs being substantially flat and slightly inclined inwardly toward each other and penetrating the gasket material and forming stops disposed substantially transversely in the gasket material to back up the gasket material and resist gas and liquid pressures thereon.

JOHN H. VICTOR.